(12) United States Patent
Kumar et al.

(10) Patent No.: US 12,450,202 B2
(45) Date of Patent: Oct. 21, 2025

(54) UNIQUE METHOD TO DIRECTLY ATTACH NFS/CIFS SHARE FOLDER TO HOST, WITHOUT CONVERTING TO ISO/IMG FILE

(71) Applicant: DELL PRODUCTS L.P., Round Rock, TX (US)

(72) Inventors: Jitendra Kumar, Bangalore (IN); Rajeshkumar Ichchhubhai Patel, Bangalore (IN); Lakshmi Satya Sai Sindhu Karri, Rajahmundry (IN)

(73) Assignee: DELL PRODUCTS L.P., Round Rock, TX (US)

( * ) Notice: Subject to any disclaimer, the term of this patent is extended or adjusted under 35 U.S.C. 154(b) by 330 days.

(21) Appl. No.: 17/971,009

(22) Filed: Oct. 21, 2022

(65) Prior Publication Data

US 2024/0134829 A1 Apr. 25, 2024
US 2024/0232142 A9 Jul. 11, 2024

(51) Int. Cl.
| | |
|---|---|
| *G06F 16/176* | (2019.01) |
| *G06F 9/4401* | (2018.01) |
| *G06F 16/182* | (2019.01) |
| *G06F 16/188* | (2019.01) |

(52) U.S. Cl.
CPC .......... *G06F 16/192* (2019.01); *G06F 9/4408* (2013.01); *G06F 16/176* (2019.01); *G06F 16/183* (2019.01); *G06F 9/4411* (2013.01); *G06F 16/188* (2019.01)

(58) Field of Classification Search
CPC .... G06F 16/192; G06F 16/183; G06F 16/176; G06F 9/4408; G06F 16/188; G06F 9/4411
USPC .......................................................... 707/831
See application file for complete search history.

(56) References Cited

U.S. PATENT DOCUMENTS

| | | | |
|---|---|---|---|
| 8,023,522 B2 * | 9/2011 | Gobriel | H04L 49/9005 709/224 |
| 8,051,180 B2 | 11/2011 | Mazzaferri et al. | |
| 8,489,872 B1 * | 7/2013 | Kapoor | G06F 16/258 718/1 |
| 8,612,439 B2 | 12/2013 | Prahlad et al. | |
| 9,058,703 B2 | 6/2015 | Ricci | |
| 10,209,850 B2 * | 2/2019 | Schick | G06F 9/452 |
| 10,496,494 B1 * | 12/2019 | Haloi | G06F 16/148 |
| 10,659,520 B1 * | 5/2020 | Sethuramalingam | H04L 67/06 |
| 10,728,090 B2 * | 7/2020 | Deshmukh | H04L 41/40 |
| 10,824,455 B2 | 11/2020 | Arikatla et al. | |
| 10,831,710 B2 * | 11/2020 | Fine | G06F 16/16 |
| 11,288,239 B2 | 3/2022 | Bafna et al. | |
| 2010/0246591 A1 * | 9/2010 | Gobriel | H04L 12/12 370/412 |

(Continued)

FOREIGN PATENT DOCUMENTS

CN 114415952 A * 4/2022 ........... G06F 16/176

*Primary Examiner* — Shahid A Alam
(74) *Attorney, Agent, or Firm* — Jackson Walker LLP; Christopher J. Rourk

(57) ABSTRACT

A method for processing data, comprising receiving a folder attached request at a virtual media service operating on a processor, creating a virtual image data file and lookup table in response to the folder attached request at the virtual media service, preparing content to be populated into a master boot record region in response to the folder attached request and generating a virtual USB device in response to the populated master boot record.

20 Claims, 2 Drawing Sheets

(56) References Cited

U.S. PATENT DOCUMENTS

| | | | |
|---|---|---|---|
| 2013/0007224 A1* | 1/2013 | Yang | H04L 67/131 |
| | | | 709/219 |
| 2017/0235507 A1* | 8/2017 | Sinha | G06F 11/2025 |
| | | | 711/114 |
| 2017/0286234 A1* | 10/2017 | Shulga | G06F 11/1469 |
| 2018/0157860 A1 | 6/2018 | Nair et al. | |
| 2018/0173516 A1* | 6/2018 | Tung | G06F 8/654 |
| 2018/0278415 A1* | 9/2018 | Von Der Lippe | H04L 9/0897 |
| 2020/0081704 A1 | 3/2020 | Bafna et al. | |
| 2021/0406136 A1 | 12/2021 | Venkatesh et al. | |
| 2022/0156107 A1 | 5/2022 | Bafna et al. | |

* cited by examiner

Unique Method to Directly Attach NFS/CIFS Share Folder to Host, Without Converting to ISO/IMG File

TECHNICAL FIELD

The present disclosure relates generally to data processing, and more specifically to a unique method to directly attach a network file system (NFS)/common Internet file system (CIFS) share folder to a host, without converting it to an ISO 9660 (ISO)/*.IMG file.

BACKGROUND OF THE INVENTION

Image data file formats can require manual processing due to system incompatibility.

SUMMARY OF THE INVENTION

A method for processing data is provided that includes receiving a folder attached request at a virtual media service operating on a processor and creating a virtual image data file and lookup table in response to the folder attached request at the virtual media service. Content that is to be populated into a master boot record region in response to the folder attached request is prepared, and a virtual USB device is generated in response to the populated master boot record.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
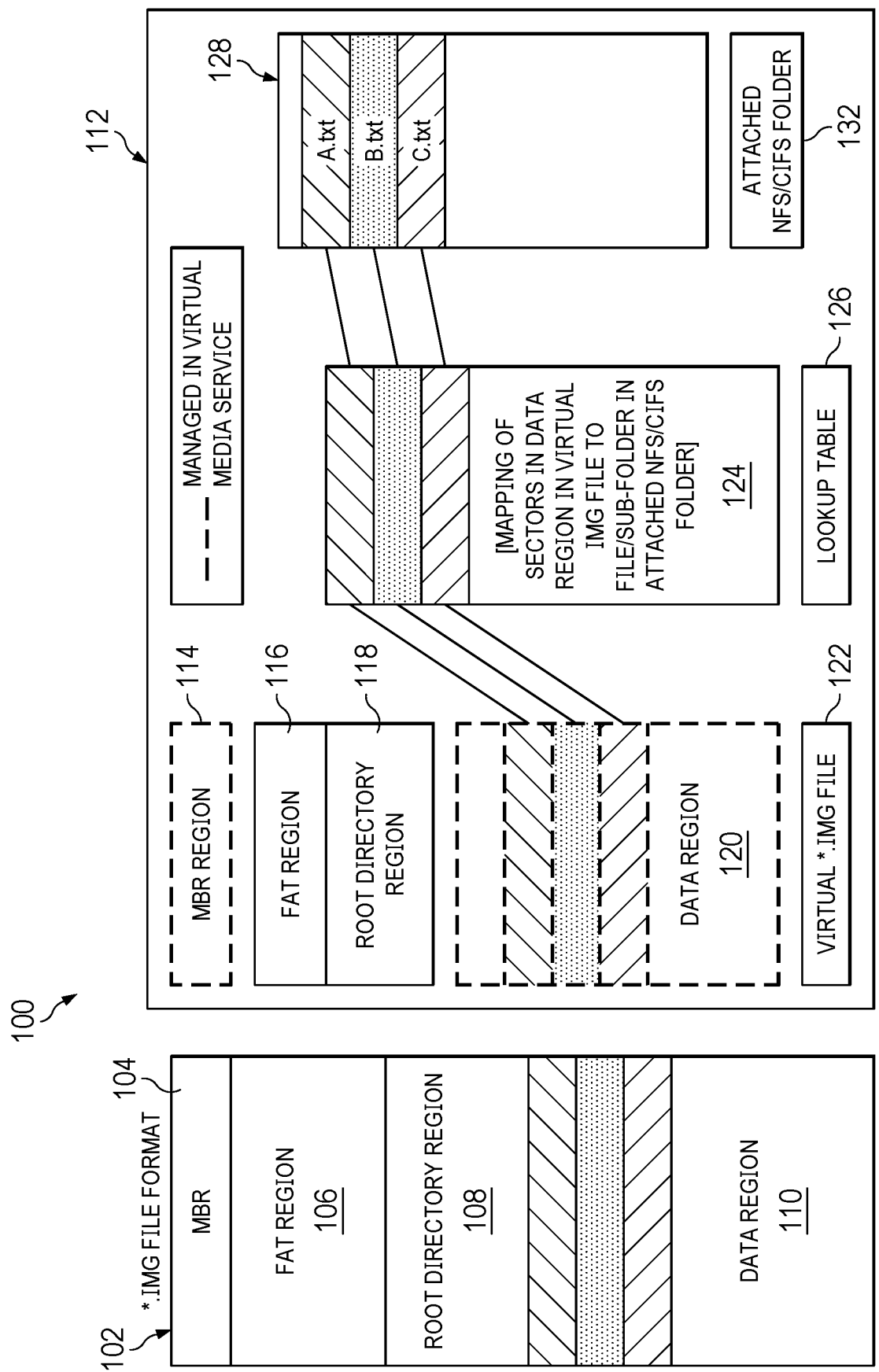
FIG. 1 is a diagram of a file structure, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Existing remote access controller remote file sharing solutions support an attachment of an ISO/*.IMG image file to a host computing system. The ISO/*.IMG file limitation can require a user to implement external tools to convert data that is to be exposed to the host into an ISO/*.IMG image file before it can be attached to host.

Remote file share leverages the *.IMG image format to attach an NFS/CIFS folder to the host. A remote access controller virtual media service can implement remote file share and can also allow an ISO/*.IMG image file to be attached. The present disclosure allows a folder to be attached without converting the NFS/CIFS folder data to *.IMG image files. To accomplish this, a virtual media service has been provided with a lookup table and a virtual *.IMG file, to process host requests to access an attached NFS/CIFS folder.

The present disclosure provides a novel method to process a host access request to attach an NFS/CIFS folder with the help of a lookup table and virtual *.IMG file that contains only a file allocation table (FAT) structure and root directory region with no data content. As a result, there is no dependency on third party or external tools to convert data to an ISO/*.IMG format before attaching the folder to the host.

If an attached folder is converted to an *.IMG file, then the size of the *.IMG file would be more than the attached folder. The present disclosure reduces the memory consumed by an attachment to less than 2% of the attached folder.

In particular, data in a *.IMG file is organized in sectors. The initial sectors in an *.IMG image file store the master boot record (MBR) region, a FAT structure and a root directory region (cluster information) which represents layout of the directory and files in the *.IMG image file when it is mounted. Any sectors following the root directory region will point to the data region in the *.IMG image file.

To support the attachment of an NFS/CIFS folder to a host along with ISO/*.IMG image files, a virtual media service is disclosed that leverages the above information and has been enhanced with a virtual *.IMG file that maintains the FAT structure and root directory region with no data region, and a lookup table that maintains information to map sectors corresponding to the data region in the *.IMG Image file to the sub-folder and files in the attached NFS/CIFS folder.

The MBR region can be created on-the-fly, such as when the host requests the MBR region or in other suitable manners. The virtual *.IMG file and lookup table can be created on receipt of a folder attach request or in other suitable manners.

On receipt of a folder attach request, the virtual media service can create the virtual *.IMG file and lookup table and can prepare content that is to be populated into the MBR region. On successful creation of the virtual *.IMG file and lookup table and the content to be populated into the MBR Region, the NFS/CIFS folder can be exposed to the host as a virtual USB device.

Host access is granted to the virtual USB device as a block device or in other suitable manners. Host access requests can be intercepted by the virtual media service, which can determine whether the request is mapped to MBR Region, the virtual *.IMG file or the data region.

If the request is for the MBR region, it can be created on-the-fly to send to the host or in other suitable manners. If the host request maps to the FAT structure and root directory region, it can be serviced with the virtual *.IMG file or in other suitable manners. If the Host request maps to the data region, then the virtual media service can use the lookup table to locate the sub-folder/file in the attached NFS/CIFS folder that is mapped to the sectors requested by the host. Once the sub-folder and file is located in attached NFS/CIFS folder, the virtual service can read the content and prepare and sends data to the host in a block size.

FIG. 1 is a diagram of a file structure 100, in accordance with an example embodiment of the present disclosure. File structure 100 includes a standard *.IMG file format 102 for comparison with virtual *.IMG file format 122, which includes data region 120, root directory region 118, FAT region 116 and MBR region 114. The relationship between virtual *.IMG file 122 and lookup table 126 and attached NFS/CIFS folder 132 is also shown.

Standard *.IMG file format 102 includes MBR 104, FAT region 106, root directory region 108 and data region 110, which only exist when *.IMG file format 102 is instantiated in a non-transient data memory device. While the data stored in standard *.IMG file format 102 can be transmitted serially or in a parallel data format, it loses its format during transmission until the transmitted data is received and again stored in a non-transient data memory device.

Virtual *.IMG file format 122 includes MBR 114, FAT region 116, root directory region 118 and data region 120, which only exist when virtual *.IMG file format 122 is instantiated in a non-transient data memory device. While the data stored in virtual *.IMG file format 102 can be transmitted serially or in a parallel data format, it loses its format during transmission until the transmitted data is received and again stored in a non-transient data memory device. In addition, MBR region 114 and data region 120 are managed in a virtual media service, unlike the corresponding MBR 104 and data region 110 of standard *.IMG file format 102. Data region 120 of virtual *.IMG file format 122 also includes a mapping of sectors to files and sub-folders in at attached NFS/CIFS folder 132, a discussed further herein.

Lookup table 126 includes a mapping of sectors in virtual *.IMG file 122 to file and sub-folders in an attached NFS/CIFS folder 124, which only exists when lookup table 126 is instantiated in a non-transient data memory device. While the data stored in lookup table 126 can be transmitted serially or in a parallel data format, it loses its format during transmission until the transmitted data is received and again stored in a non-transient data memory device. The *.txt format files of 128 and the sub folder are a detail of the contents of attached NFS/CIFS folder 132. The lines joining 122 to 128 show the entry in lookup table 126 that corresponds to a particular file/sub-folder in attached NFS/CIFS folder 132.

Figure 2:
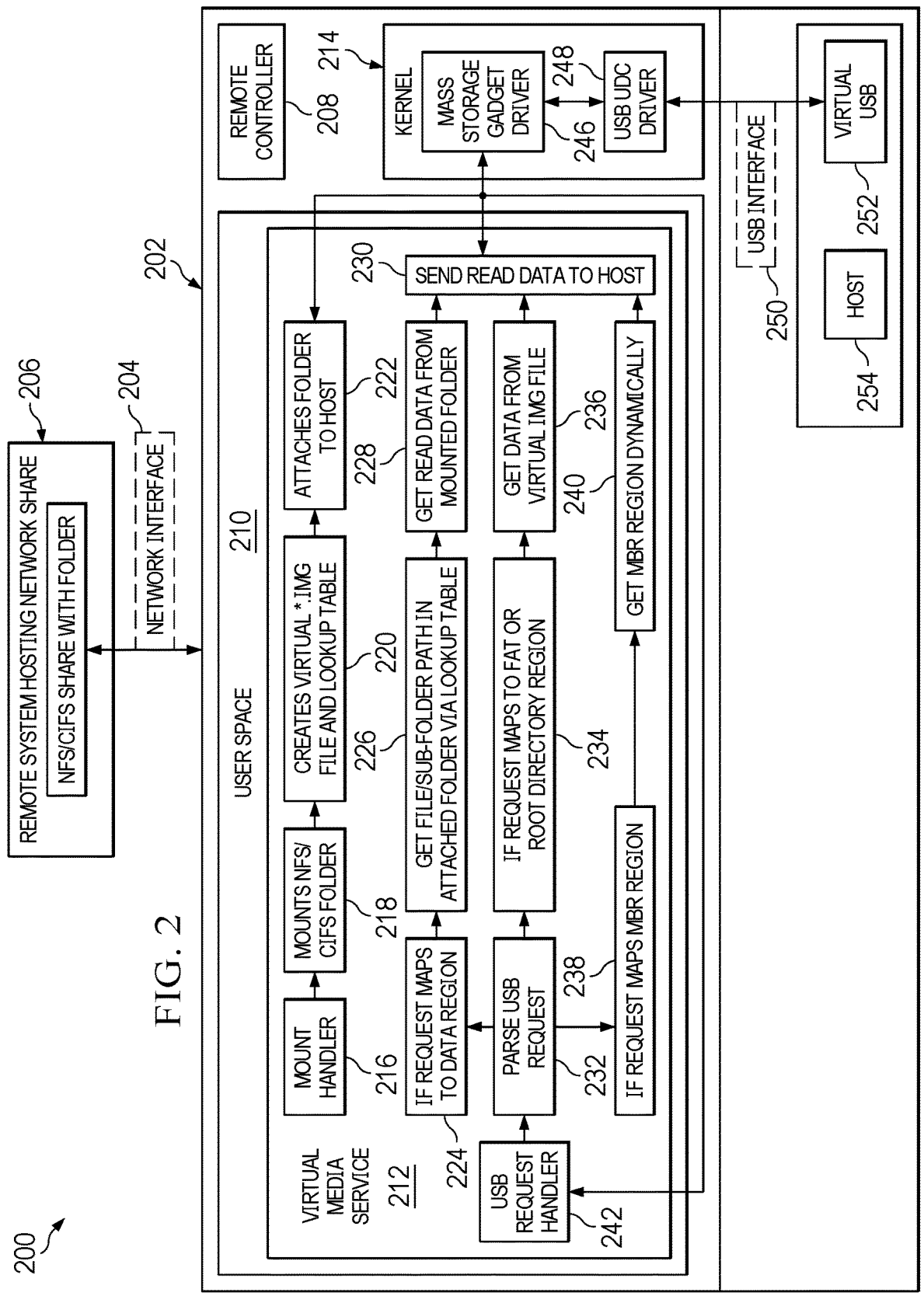
FIG. 2 is an algorithm for using the disclosed file structure, in accordance with an example embodiment of the present disclosure.

FIG. 2 is an algorithm 200 for using the disclosed file structure, in accordance with an example embodiment of the present disclosure. Algorithm 200 can be implemented in hardware or a suitable combination of hardware and software.

Algorithm 200 operates in conjunction with virtual media service 212 and user space 210 of remote controller 208. Remote system hosting network share 206 includes NFS/CIFS share with folder, and couples through network interface 204 to remote controller 208. Host 254 generates a host request, which is processed by virtual USB 252 and provided to USB UDC driver 248 through USB interface 250. Mass storage gadget driver 246 of kernel 214 interfaces to 222, 230 and 242 of algorithm 200.

At 216, a handler of virtual media service 212 is mounted. The algorithm then proceeds to 218.

At 218, an NFS/CIFS folder of virtual media service 212 is mounted, as discussed and described further herein. The algorithm then proceeds to 220.

At 220, a virtual *.IMG and lookup table of virtual media service 212 is created, as discussed and described further herein. The algorithm then proceeds to 222.

At 222, the NFS/CIFS folder is attached to a host, as discussed and described further herein.

At 242, a USB request handler receives data from mass storage gadget driver 246, as discussed and described further herein. The algorithm then proceeds to 232.

At 232, the USB request is parsed. If it is determined that the request maps to a data region, the algorithm proceeds to 224, as discussed and described further herein. If it is determined that the request maps to FAT or root directory region, the algorithm proceeds to 234, as discussed and described further herein. If it is determined that the request maps to an MBR region, the algorithm proceeds to 238, as discussed and described further herein.

At 224, after the request maps to data region, the algorithm proceeds to 226.

At 226, the file or sub-folder path in attached folder is obtained via lookup table, as discussed and described further herein. The algorithm then proceeds to 228.

At 228, the algorithm gets read data from the mounted folder. The algorithm then proceeds to 230 where the read data is sent to the host, as discussed and described further herein.

At 238, if it is determined that the request maps to an MBR region, the algorithm proceeds to 240.

At 240, the algorithm dynamically gets the MBR region. The algorithm then proceeds to 230 where the read data is sent to the host, as discussed and described further herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method for processing data, comprising:
   receiving a network file system (NFS) folder attached request at a virtual media service operating on a processor;
   creating a virtual image data file and a lookup table having a map using the virtual media service in response to the NFS folder attached request at the virtual media service;
   preparing content to be populated into a master boot record (MBR) region and the lookup table in response to the NFS folder attached request; and
   generating a virtual universal serial bus (USB) device in response to the populated MBR.

2. The method of claim 1 further comprising parsing a USB request to determine whether the USB request maps to a data region.

3. The method of claim 2 further comprising getting a path identified using a look-up table of a file allocation table structure.

4. The method of claim 2 further comprising getting read data from the NFS folder in response to the USB request.

5. The method of claim 2 further comprising sending read data to a host in response to the USB request.

6. The method of claim 1 further comprising parsing a USB request to determine whether the USB request maps to a region of the MBR.

7. The method of claim 6 further comprising getting data from the MBR region and the lookup table.

8. The method of claim 6 further comprising getting data from the MBR region and a file allocation table structure of the lookup table and sending read data to a host.

9. The method of claim 1 further comprising parsing a USB request to determine whether the USB request maps to a root directory region.

10. The method of claim 9 further comprising getting data from a virtual image data file if the USB request maps to the root directory region.

11. A system for processing data, comprising:
    a data processing device configured to read algorithmic instructions from a data memory and to perform algorithmic processes in response, comprising:
    receiving a network file system (NFS) folder attached request at a virtual media service operating on a processor;
    creating a virtual image data file and a lookup table having a map using the virtual media service in response to the NFS folder attached request at the virtual media service;
    preparing content to be populated into a master boot record (MBR) region and the lookup table in response to the NFS folder attached request; and
    generating a virtual universal serial bus (USB) device in response to the populated MBR.

12. The system of claim 11 wherein the processor is configured to parse a USB request to determine whether the USB request maps to a data region.

13. The system of claim 12 wherein the processor is configured to get a path identified using a look-up table of a file allocation table structure of the NFS.

14. The system of claim 12 wherein the processor is configured to get read data from a folder in response to the USB request.

15. The system of claim 12 wherein the processor is configured to send read data to a host.

16. The system of claim 11 wherein the processor is configured to parse a USB request to determine whether the USB request maps to a region of the MBR.

17. The system of claim 16 wherein the processor is configured to get data from the MBR region and the lookup table.

18. The system of claim 16 wherein the processor is configured to get data from the MBR region and a file allocation table structure send read data to a host.

19. The system of claim 11 wherein the processor is configured to parse a USB request to determine whether the USB request maps to a root directory region.

20. The system of claim 19 wherein the processor is configured to get data from a virtual image data file if the USB request maps to the root directory region.

\* \* \* \* \*